United States Patent
Cambou et al.

(10) Patent No.: US 11,610,629 B2
(45) Date of Patent: Mar. 21, 2023

(54) SENSING SCHEME FOR LOW POWER RERAM-BASED PHYSICAL UNCLONABLE FUNCTIONS

(71) Applicant: Arizona Board of Regents on Behalf of Northern Arizona University, Flagstaff, AZ (US)

(72) Inventors: Bertrand F Cambou, Flagstaff, AZ (US); Julie B Heynssens, Flagstaff, AZ (US); Ian Burke, Flagstaff, AZ (US); Taylor Begay, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 125 days.

(21) Appl. No.: 17/395,360

(22) Filed: Aug. 5, 2021

(65) Prior Publication Data

US 2022/0044727 A1 Feb. 10, 2022

Related U.S. Application Data

(60) Provisional application No. 63/061,661, filed on Aug. 5, 2020.

(51) Int. Cl.
*G11C 11/00* (2006.01)
*G11C 13/00* (2006.01)
*H04L 9/08* (2006.01)
*H04L 9/32* (2006.01)

(52) U.S. Cl.
CPC ........ *G11C 13/0069* (2013.01); *G11C 13/004* (2013.01); *H04L 9/0819* (2013.01); *H04L 9/3278* (2013.01)

(58) Field of Classification Search
CPC . G11C 13/0069; G11C 13/004; H04L 9/0819; H04L 9/3278
USPC .......................................................... 365/148
See application file for complete search history.

(56) References Cited

U.S. PATENT DOCUMENTS

2016/0156476 A1* 6/2016 Lee .................... H04L 9/0866 380/44
2019/0207758 A1* 7/2019 Cambou .............. H04L 9/0866

OTHER PUBLICATIONS

B. Cambou, "Unequally Powered Cryptography With PUFs for Networks of IoTs," IEEE Spring Simulation Conference, 2019.
(Continued)

*Primary Examiner* — Vu A Le
(74) *Attorney, Agent, or Firm* — Quarles & Brady LLP

(57) ABSTRACT

A system and method of secure communication between computing devices based on physical unclonable functions such as memories having dissolvable conductive paths is provided. The method involves enrolling a client device, the client device having a PUF such as a pristine ReRAM. The PUF is enrolled in a secure environment by reading and storing the resistances of the PUF's addressable memory cells. The cells are categorized into "rugged" and "vulnerable" categories on the basis of their resistance, the vulnerable cells being those more likely to be permanently altered during the generations of PUF responses. The rugged cells are used for the generation of PUF responses for cryptographic key generation, but the vulnerable cells may be inspected to detect unauthorized 3rd party access to the PUF.

20 Claims, 11 Drawing Sheets

(56) References Cited

OTHER PUBLICATIONS

B. Cambou et al., "Response-Based Cryptographic Methods with Ternary Physical Unclonable Functions"; 2019 SAI FICC, IEEE, 2019.
B. Cambou et al., "Ternary Computing to Strengthen Cybersecurity, Development of Ternary State based Public Key Exchange", 2018 SAI Computing Conference, IEEE 2018.

* cited by examiner

SENSING SCHEME FOR LOW POWER RERAM-BASED PHYSICAL UNCLONABLE FUNCTIONS

CROSS-REFERENCE TO RELATED APPLICATIONS

The present application claims priority to U.S. Provisional Application 63/061,661 entitled "Sensing Scheme For Low Power ReRAM Based Physical Unclonable Functions", filed Aug. 5, 2020, the disclosure of which is incorporated herein by reference in its entirety.

STATEMENT CONCERNING FEDERALLY-FUNDED RESEARCH

This invention was made with the support of the Government under Grant/Contract No. 1004251 awarded by the United States Air Force Research Laboratory. The government may have certain rights in the invention.

FIELD OF THE INVENTION

The present disclosure relates to implementations of physically unclonable functions (PUFs) for, for example, cryptographic and authentication purposes. Specifically, the disclosure describes implementations of systems that use memory arrays relying on temporary dissolvable conductive paths to generate PUFs. An example of such a memory array is a resistive RAM ("ReRAM) array, which may be read using low levels of injection current.

BACKGROUND

Information is frequently encrypted to protect against eavesdropping and unauthorized access using encryption schemes based on the use of one or more encryption keys and other keyless encryption schemes. Encryption schemes are frequently used in conjunction with authentication schemes to improve the security of electronic systems. PUF-based security systems use a PUF device as an "electronic fingerprint" unique to a user or device in possession or control of the PUF device, allowing an authentication system to challenge a client seeking authentication, receive a response generated by the client using a PUF device, and then compare the received with a stored response previously received from the client or derived from characteristics of the PUF device and verifying that the two responses match.

Some memory elements rely on the formation of temporary dissolvable or breakable conductive paths through otherwise insulting dielectric material to store a logic state. Such memory elements include conductive bridge RAMs (CBRAM), memristors, and resistive random access memories (ReRAMs). These memory arrays may be used to generate PUFs capable of supporting the secure communications methods introduced above. ReRAMs are normally used to store digital memory bits with a high resistance state (HRS) indicating one digital value and a low resistance state (LRS) indicating the opposite digital value. Conventionally, pre-formed ReRAM cells comprise two electrodes: a first electrode including active metallic material such as Cu, Ag, Ta, Al or Ti, and a second electrode include a passive metallic material such as W or Pt. The electrodes are arranged on either side of a dielectric material, as shown in FIG. 1. Before ReRAM devices can be used as a conventional digital memory device, the devices must be pre-formed. This process involves application of a voltage across the device that is higher than some critical threshold. When such a voltage is applied, cations (e.g., Cu or other active metal ions) migrate from the first (active) electrode into the dielectric material to form one or more essentially permanent, but breakable or dissolvable, conductive paths (e.g., conductive filaments).

Pristine (i.e., unformed) ReRAM cells have extremely high resistance values, typically higher than 100 MΩ. The pre-forming process triggers an avalanche effect of the cations to form conductive filaments by ramping up the voltage across the top electrodes and bottom electrodes of each cell (FIG. 1). The formation of these filaments results in a ReRAM cell having a low resistance state (LRS), which is typically around 5 KΩ. During a setting operation, one or more of the formed conductive paths may be broken or otherwise rendered discontinuous, resulting in the cell having a high resistance state (HRS), typically around 20 KΩ. This process is reversible, enabling the cell to be switched between its LRS and its FIRS state to store one of two binary values.

The pre-forming process is irreversible, which is to say, that the conductive paths created by the forming process may be broken, but never completely removed. Thus, once ion filaments start to form in the dielectric, the electrical resistance of the device is permanently lowered by several orders of magnitude from the very high resistance of the pristine unformed device, to the relatively lower (but still higher than the LRS) resistance of the formed devices' HRS.

The pre-forming process of filament formation begins with a process called nucleation. Nucleation is when clumps of ions begin to group together at one of the contact points. Forming begins when ions start to form filaments at one or more nucleation sites. A formula linking the critical electric field cc in the dielectric, and the forming operation is given by:

$$\text{Hopping conduction dominates: } \varepsilon_C < \frac{2KT}{azq} \quad \text{(Equation 1)}$$

$$\text{Forming begins: } \varepsilon_C > \frac{2KT}{azq} \quad \text{(Equation 2)}$$

In these cases $$\frac{KT}{q} \cong 25 \text{ mV}$$

at room temperature, z is the charge number of the ion reaction and will be constant for a given device type, and a is the mean hopping distance. The mean hopping distance is the average distance between defects, also known as traps, in the dielectric and is unique to each ReRAM cell. After pre-forming, the cells are programmed as "1" by breaking these filaments with a negative bias, the reset cycle, and reaching an FIRS (typically 20 KΩ). The cells are programmed as "0" by re-forming the filament with positive bias, the set cycle, and bringing the resistance values to an LRS.

BRIEF SUMMARY

Embodiments of the invention are directed to the design of low power PUFs using arrays of pristine or unformed ReRAM cells. A physical response of the unformed cells may be measured by injection of small currents during challenge-response cycles to generate cryptographic keys. When injected with currents in the approximate range of 1 nA to 1 µA, the resistance values of the cells drop to the 0.1 MΩ to 20 MΩ range. After measurement, the resistance values return to the original high resistance values of the pristine states (typically 100 MΩ or higher). Thus, the resistance of the cells measurable with small current injection is ephemeral and reversible.

Unformed ReRAM cells have certain advantages making them particularly well suited for PUF generation. First, the unformed resistance of each ReRAM cell in a memory array is unique to that cell and depends on the number, location, and density of defects within the dielectric layer along with the precise thickness and area of the top electrode and the bottom electrode. All of these parameters vary from cell to cell and device to device due to manufacturing variations. Accordingly, ReRAM based PUFs have significant and random cell to cell variation in resistance, which means that each device has a unique digital "fingerprint", i.e., the distribution of resistances across the array at one or more injection current values. Typically, inter-PUF standard variations are in the 50% range of the median values. The variation in cell resistance (i.e., PUF response) for a ReRAM array can be seen in FIG. 2, which is a plot of resistance as a function of injection current for a number of cells in an exemplary array.

Additionally, ReRAM based PUFS exhibit large intra-PUF (i.e., intra-cell) variations when the cells are subject to various injected currents. This effect may also be seen in FIG. 2. As shown, when the current applied to any given cell varies from 100 nA to 800 nA, the resistance typically drops by a large factor (for example, 4 times). However, each cell will typically behave differently from the others when the injected current varies. Thus, a cryptographic key (i.e., a set of PUF responses or measurements) generated at 100 nA is different than a key generated at 800 nA because the respective order in the resistance values of the cells changes with injection current. This is reflected graphically in FIG. 2, which shows that while all cells show a roughly negative and linear relationship between current and resistance, over the range of current plotted, the slopes of these curves vary cell-to-cell. For example, as shown in FIG. 2, the cell plotted at the fifth position from the bottom at 100 nA has the lowest resistance value at 800 nA.

The cell to cell resistance variability combined with the property of each cell having a different resistance as a function of injected current greatly expands the number of keys that can be generated from a single ReRAM-based PUF. Different measurements of arrays of cells may be taken with a single current value for all cells to generate a key. Other keys may be generated using the same or different cells measured at a different current value. Other keys may be generated by measuring different cells with different current values, or the same cell with different current values. At the same time, the unformed resistance of a particular ReRAM cell is significantly repeatable. When unformed cells are subjected to repetitive testing at the same current/temperature conditions, the resistance values are stable with a small amount of variation. Typically, the intra-PUF relative standard variations are less than 10% of the median resistance values.

Thus, the impact of environmental effects like temperature on cell resistance is relatively small and predicable, as shown in FIG. 3, which is a plot of resistance versus temperature for a number of ReRAM cells at an 800 nA injection current. Temperature related variation may be mitigated by characterizing ReRAM based puffs in an enrollment process that includes temperature measurements, the use of temperature sensing during response generation, and the blanking of the cells behaving differently than the general population.

In a first embodiment, a method is provided of establishing secure communication between a server and client computing device. The client computing device includes an array of unformed memory cells in which formation of breakable conductive paths may be induced. The method includes performing an enrollment process on the client computing device. The enrollment process includes selecting a probe current value, the probe current value being sufficiently low such that when current is passed through the memory cells of the array of unformed memory cells, the cells do not exhibit conductive path formation. The enrollment process also includes applying the selected probe current value to the cells of the array of unformed memory cells, and measuring their resistance. The enrollment process also includes categorizing all measured cells having a resistance above a first threshold in a first category, and categorizing all measured cells having a resistance below a second threshold in a second category. The method further includes selecting an interrogation current value, measuring the resistance of the cells categorized in the second category at the interrogation current value, and storing the measured resistance of the cells categorized in the second category and addresses of the measured cells in a database.

Certain embodiments are directed to a method of secure message exchange with a server computing device. Some embodiments include receiving a set of addresses corresponding to unformed memory cells in an array of unformed memory cells in which formation of breakable conductive paths may be induced, measuring the resistances of the cells corresponding to the received addresses at a predetermined current level, and generating a cryptographic key on the basis of the resistance measurements. Such embodiments also include using the cryptographic key to encrypt a message and transmitting the message to the server computing device.

Certain embodiments are directed to a cryptographic communication system. The system includes a client computing device in electronic communication with an array of unformed memory cells in which formation of breakable conductive paths may be induced, the client computing device being configured to measure the resistance of one or more of the unformed memory cells in response to computer executable instructions identifying one or more of the unformed memory cells to be measured. The system also includes a server computing device in electronic communication with a non-volatile memory having computer readable data encoded therein reflecting resistance measurements of a plurality of cells of the array of unformed memory cells at an interrogation current level and addresses of those cells.

Using unformed ReRAM cells to generate PUFs usable for key cryptographic key generation has certain advantages. First, the energy needed to read each cell is extremely low which is desirable. High resistance devices consume less electrical power, and low electrical power means that smaller electric fields will develop around the devices. This makes systems operating according to preferred embodiments resistant to side-channel attacks. In a side-channel attack, the attacker attempts to use the electric fields around a protected device to read encryption keys. The low field strength inherent in protocols of the present disclosure make embodying systems less susceptible to side-channel analysis. For example, the typical latency needed to read a 10 MΩ cell at 100 nA is 1 µS. This represents an energy of 100 femto-joules, a level below detectable threshold.

Another advantage of systems according to certain embodiments stems from the ability of unformed ReRAM cells to return to a quasi-pristine state after key generation (during enrollment), or an authentication measurement. Interrogating ReRAM cells with low current levels does not physically change the cell in a measureable way, or otherwise leave behind a trace that can be analyzed by the opponent. At the same time, however, this property makes it difficult to tell whether an opponent who obtained physical possession of or electronic access to the PUF has made measurements sufficient to characterize it.

Certain embodiments mitigate this disadvantage by enrolling and using ReRAM based PUFs in a manner that makes third party attempts to characterize the PUFs detectable. In such embodiments, ReRAM cells are characterized at a device enrollment phase and sorted into two categories: a rugged cell population (RCP) and a vulnerable cell population (VCP). The VCP includes cells that, at a predetermined current level, will begin the irreversible (and detectable) process of forming conductive pathways in the dielectric. The RCP includes cells that, for the predetermined current level, are not near the critical voltage that would cause the cell to begin the forming process. Cryptographic keys may be generated using only RCP cells interrogated at a safe predetermined current level. The interrogation current level, however, may be selected to be sufficiently high that, while not capable of altering the RCP cells, has a very high chance of permanently altering the VCP cells.

In the event that the device falls into the hands of an attacker, or an attacker otherwise gains communications access to the device, the attacker will not be aware of the identities of cells in the VCP or RCP populations, or the safe (or safe range of) interrogation current. If the attacker attempts to fully characterize the device by sweeping all cells with a wide range of currents to measure all possible responses, some of the cells interrogated by the attacker will be in the VCP, and therefore, are highly likely to be physically changed by the attacker's attempt to characterize the device. Even if the attacker is aware of the predetermined interrogation current used to generate responses, if the attacker attempts to measure VCP cells with this current to fully characterize the device, the result will be damaged VCP cells, since the interrogation current is chosen to be above the breakdown threshold for the VCP cells. As is set forth above, once the ReRAM formation process begins, it drops the resistance of a cell dramatically, and this process is irreversible. In systems according to inventive embodiments, VCPs in a ReRAM array on a client device may be periodically analyzed, and their resistance compared to a previously measured state, to determine whether an attacker has attempted to characterize the device.

The above features and advantages of the present invention will be better understood from the following detailed description taken in conjunction with the accompanying drawings.

BRIEF DESCRIPTION OF THE DRAWINGS

The drawings described herein constitute part of this specification and includes exemplary embodiments of the present invention which may be embodied in various forms. It is to be understood that in some instances, various aspects of the invention may be shown exaggerated or enlarged to facilitate an understanding of the invention. Therefore, drawings may not be to scale.

DETAILED DESCRIPTION

Figure 1:
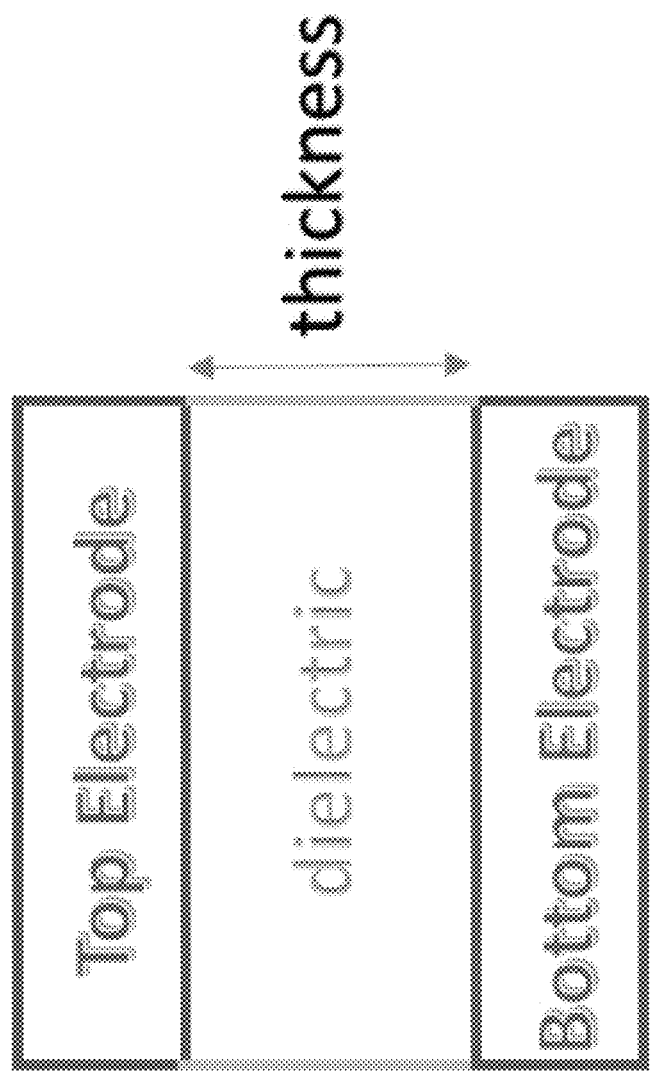
FIG. 1 depicts a mechanical cross section of an individual ReRAM cell usable for PUF generation according to certain embodiments.

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment. References to "users" or a "client" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource. As used herein, both a client and server refer to computing devices having at least a programmable processor in communication with non-volatile memory having stored therein computer readable and computer executable instructions operable to cause the processor to execute instructions corresponding to the method steps described in this disclosure.

Conventional systems and methods for secure communication frequently rely upon encryption of messages using encryption keys which may be symmetrical or asymmetrical (e.g., in public key encryption schemes). Such key-based encryption schemes have disadvantages. First keys must be generated and stored by various parties, introducing the possibility that the keys may be compromised by a malicious party. Additionally, key-based encryption schemes may be vulnerable to brute force attacks wherein a malicious party may discover the key given access to a message encrypted with that key.

Also, Conventional systems and methods for challenge-response authentication have disadvantages. For example, when the server and the client communicate over an insecure channel, both the challenges and the challenge responses may be intercepted, providing information which may be useful to an attacker.

Embodiments disclosed herein address these and other shortcomings by using physical unclonable function generators (APGs) to generate unique, difficult to intercept challenge-response pairs, and eliminate the need to exchange keys over potentially insecure communication channels, thereby improving security. PUF generators can be thought of as "wallets" of keys that are addressable though a handshake with a server. Rather than exchanging keys through insecure communication channels, both parties exchange (or independently access) sets of processing instructions, which may include randomly generated PUF addresses, and generate the keys directly from their "wallets." Thus, large numbers of keys can be made available for use with cryptography, without requiring large exchanges of information over communication channels which may weaken security and/or impose performance penalties.

In the context of this disclosure, a processing instruction is any information used to cause an APG to produce an expected response (sometimes referred to as a "challenge response" in the context of authentication systems) corresponding to that information by measuring one or more PUF devices. Processing instructions may be used to cause an APG to access devices (or ranges of devices) in an array of PUF devices belonging to the APG. Along these lines, a processing instruction may be input supplied to an APG which is used to produce a response having one or more expected values which depend upon characteristics' of the PUF array belonging to the APG to which the processing instruction is issued. The appropriate response may be derived from those characteristics using instructions stored by the APG or other processing circuitry, received by the APG or other processing circuitry and/or additional information supplied to the APG or other processing circuitry (such as a password of a user). In one simple non-limiting example, a processing instruction might simply cause an APG to measure a physical response or characteristic of devices of a PUF array at a specified address or range of addresses. In other non-limiting examples, a processing instruction processing instruction might include instructions to perform a mathematical, logical, or other operation(s) on those values.

An array of addressable PUFs can be used as an addressable wallet of cryptographic keys. The PUFs are the "fingerprints" of microelectronic components such as the ReRAM memory devices discussed herein. During enrollment, the fingerprint of the PUF of the client device is memorized by the server in the form of a look up table, or cryptographic table. Assuming that the PUF is reliable, the same reading can be extracted on demand. Error matching and correcting methods can be used to address potential small mismatches between the stored expected response data and the measured challenge response. This may be advantageous when the PUF is subject to aging, temperature changes, or environmental variations. A processing instruction (e.g., a range of PUF addresses) generated by the server side may become a "public key" that is openly shared between communicating parties. The processing instruction may be hashed with an additional password, PIN code, and/or biometric data (e.g., fingerprint, vein pattern, or retinal data). In some embodiments, both a server and a client device (or other such devices) that share access to data representing characteristics of a PUF itself can independently generate encryption key pairs according to any suitable asymmetric encryption scheme. While such asymmetric key pairs frequently referred to as "public" and "private" keys, it should be noted that the embodiments herein enable the use of such key pairs without the need for a so-called "public" key to be published or made publicly available in any way, while still realizing the other known benefits of public/private key encryption.

Embodiments disclosed herein are directed to ReRAM based APGs. As is set forth above, such devices are usable, for example, to enable secure authentication and identification of client devices and for generation of keys or key pairs for cryptography, as in a public key infrastructure (PKI).

In many of the embodiments disclosed herein, the APG includes an addressable ReRAM in its pristine state. The PUF challenge for such a device may be a set of ReRAM cell addresses, a target probe or interrogation current for each cell, and additional parameters such as temperature. When the measurement conditions are applied to the PUF, a challenge response is generated. An exemplary response for PUFs disclosed herein is a resistance measurement. The APG may be characterized by, in a secure environment, applying a predetermined range of probe currents to each cell of an unformed ReRAM memory array, and recording the challenges and the responses in a table. The table may then be used to authenticate future communications with the device carrying the APG. Challenge-response pairs may also be used, by an APG carrying client device and the server, to generate cryptographic key pairs. For example, devices in communication may treat a challenge as a public key, and a PUF response as a private key, using any suitable PKI such as Rivest-Shamir-Adleman cryptosystem (RSA), DSA, and Elliptic Curves (ECC).

In such schemes, the challenge, or range of addresses, may be thought of as a shared public key, which may be transmitted from a server to a client. Preferably, this transmission occurs securely, with the address information being encrypted. The client may generate a private key by interrogating the PUF devices at the specified range of addresses, and measuring the response (e.g., the resistance) of those devices. That measurement may be used to produce a bit stream, which may be used to generate a private key. The server side device, which has previously enrolled the client device and generated a cryptographic table of the responses of the client's device, may generate the same private key. The two devices may then use their keys to encrypt and decrypt shared communications.

Figure 4A:
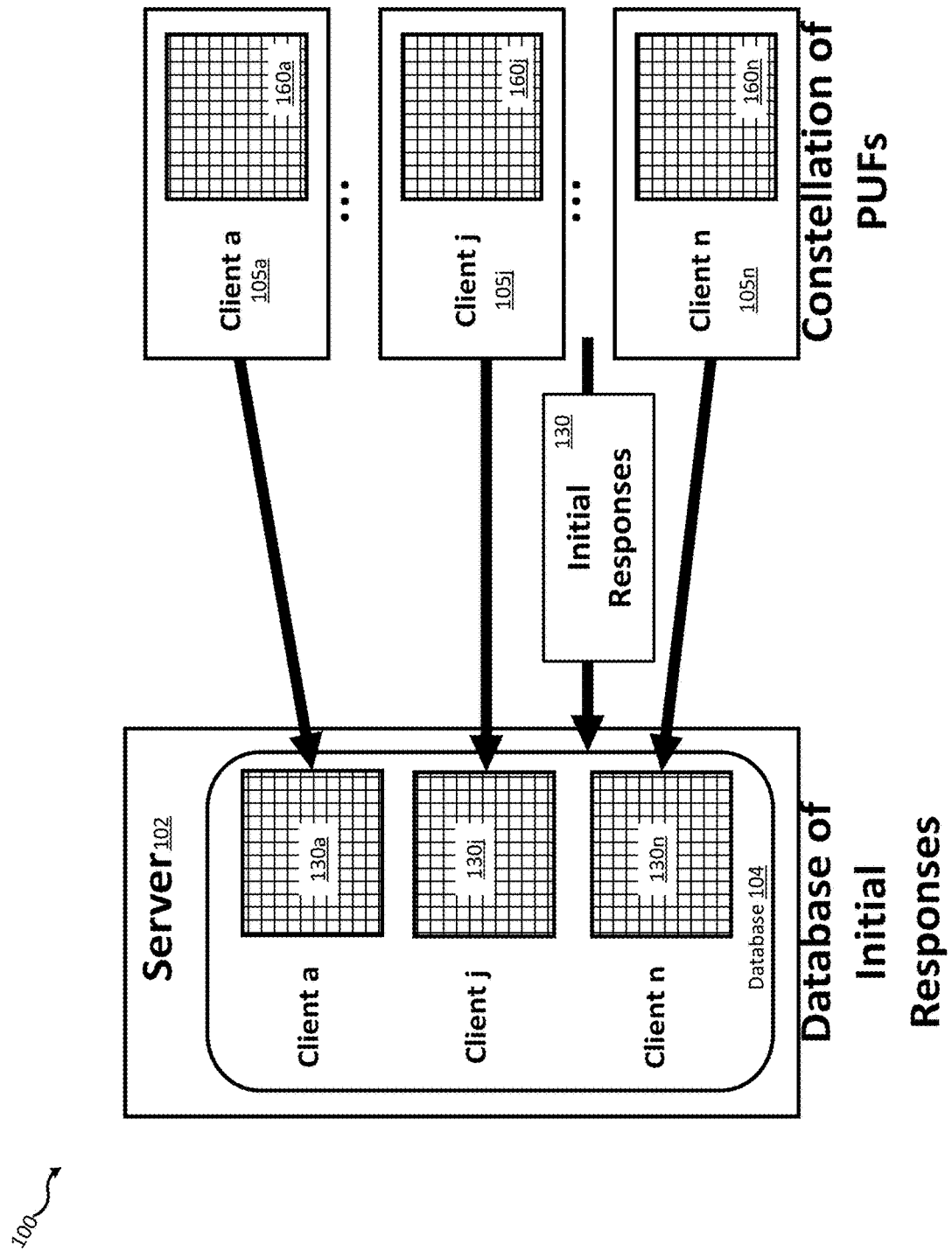
FIG. 4A depicts an enrollment procedure wherein a server issues processing instruction to clients having PUF arrays and stores measurements of PUF devices determined using those instructions for use in subsequent authentication of the clients, according to one embodiment.

According to various embodiments, a PUF-enabled authentication/communication protocol includes the following stages: (1) Enrollment, (2) Handshaking, and (3) Authentication/Encryption Key generation. FIG. 4A is a conceptual block diagram of a computing environment 100 using unformed ReRAM arrays on client devices as PUFs according to inventive embodiments. The environment 100 includes a server 102 and client devices, hereinafter clients 105 (represented by clients 105a, 105j, and 105n). The sever 102 manages a database 104 which may be stored in memory of the server 102. The database 104 stores a set of initial challenge responses 130, which may be generated in response to challenges issued by the server 102 to the clients 105, each of which may respond to the challenges by accessing a respective PUF array 160 represented by the PUF arrays 160a, 160j, and 160n belonging to clients 105a, 105j, and 105n. PUF arrays 104a, 105j, and 105n may be pristine (unformed) ReRAM arrays, with individual addressable memory cells such as those depicted in FIG. 1. The server 102 may be otherwise provided with information suitable to generate the initial challenge responses 130.

A PUF array 160 may form parts of an addressable PUF generator (APG), which may contain additional processing circuitry and execute instructions for generating challenge responses. For example, an APG may include a processor or microcontroller, network communications interface, non-volatile memory for storing data and instructions executable by the processor, and circuitry sufficient to generate probe current, measure resistance of ReRAM cells in accordance with received instructions, and digitally encode the resulting resistance data, thereby generating a PUF response. These measurements may be done directly or indirectly, and may involve current-voltage measurements and a calculation of resistance.

Enrollment is performed for each client 105 in a secure environment. Exemplary enrollment processes are described in additional detail below, but at a high level, enrollment includes the steps of selecting ReRAM addresses, applying a probe current, measuring the resulting resistance of the selecting ReRAM cells, and storing the addresses, the probe current and the resistance in the server database 104, for example, in a challenge table. After enrollment, the constellation of clients 105 may operate in an insecure environment and communicate with each other over public networks. For example, a server may authenticate an enrolled client by transmitting a challenge, receiving the client-generated response, and comparing the response to the initial response stored in database 104. Alternatively, challenges and responses may be used, themselves or in combination with additional information for cryptographic key generation. Various means of secure cryptographic communication using PUFs, which are usable in combination with the embodiments disclosed herein, are disclosed in, for example, U.S. patent application Ser. Nos. 16/416,028m 16/492,572, and 16/818,807, all of which are incorporated herein by reference in their entirety.

Figure 4B:
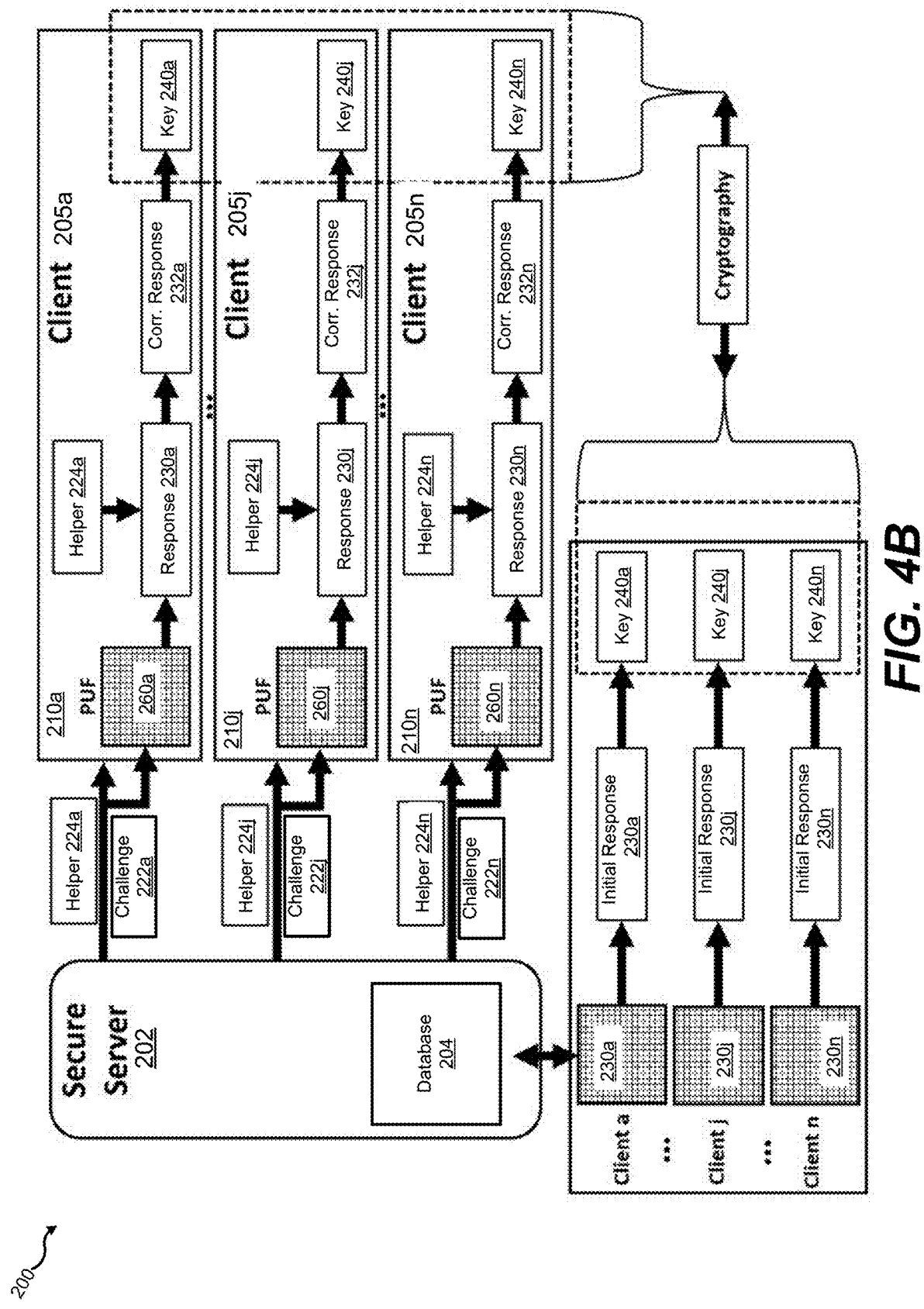
FIG. 4B depicts a computing environment including a server and one or more clients engaging in secure communication according to certain embodiments.

FIG. 4B illustrates a simplified example embodiment 200 of clients 205 (i.e., clients {205a, . . . 205j, . . . 205n}) having APGs 210 (i.e., APGs {210a, . . . 210j, . . . 210n}) belonging to a client 205, interacting with a server 202 according to embodiments disclosed herein. Each APG 210 includes a PUF array 260 (i.e., APGs {260a, . . . 260j, . . . 260n}) which may be accessed by a microcontroller or other processing circuitry of each client 205. The PUF array 260 of a client 205 is an array of electronic or other devices with measurable physical characteristics, configured in an addressable array similar to an addressable memory device such as RAM or ROM chip. In many embodiments described herein PUF array 260 is an array of unformed memory cells in which breakable conductive paths may be induced. Examples include a ReRAM array, a memristor array, and CBRAM array. Due to small variations which occur during semiconductor manufacturing or other manufacturing processes, each PUF device (and hence each PUF array 260) may be unique, even if the PUF arrays are mass-produced by a process designed to produce nominally identical devices. The PUF array 210 (shown as a 2D-array of cells) of a client 205 may be accessed by the client 205 which receives challenges 222 (originating in this example from the server 202). The APG 210 responds by to challenges 222 by generating responses 230 using measured characteristics of one or more PUF devices within the PUF array 260 identified by the challenge 222 or derived from it using instructions stored by the APG 210.

Each client 205 (represented by "Client a", "Client j", and "Client n", i.e, clients 205a, 205j, and 205n shown) has an APG 210 containing a PUF array 260 that is unique to that client 205. The APG 210 of a client 205 may be used to generate numerous responses 230 (i.e., responses {230a, . . . 230j, . . . 230}) unique to that client 205. These responses 230 cannot be replicated by an attacker without physical access to the PUF array 260. During the Enrollment stage, the server 202 may obtain the initial responses 230 for each client 205 by generating a plurality of challenges 222 and storing responses 230 to those challenges 222 generated by each APG 210 in a database 204. Alternatively, the server 202 may be otherwise supplied with characteristics of each PUF array 260 sufficient to generate the expected responses 230. The microcontroller 220 may include instructions to combine information from the challenge 222 with additional information (such as a user password 223) and pass the combination through a hash function 221 the result to produce the address 225 (or range of addresses) within the PUF array 260 to measure in order to generate the proper response 230.

After the clients 205 are enrolled with the server 202, embodiments disclosed herein may be utilized to authenticate the client 205 and produce an encryption key which the server 202 and client 205 may use to communicate securely. First, the server 202 and a client 205 (such as "Client j" shown in FIG. 2A) enter the Handshaking stage. In the Handshaking stage an objective is for the server 202 to transmit the information needed to identify a particular portion of the PUF array 260 of the client 205. Both the server 202 and the client 205 can independently produce a response to the challenge: the server can lookup information about the PUF array 260 obtained during enrollment (or otherwise supplied to the server 202) and the client 205 can retrieve the same information by using the APG 210 to access the PUF array 260.

During Handshaking, the server 202 issues a challenge 222 to the APG 210 of the client 205. This challenge 222 is used by the APG 210 to identify the portion of the devices belonging to the PUF array 260 to access. This challenge 222 may be a random number. In some embodiments, the server 202 and the client 205 may have access to the same random number generator or may have synchronized random number generators. In such embodiments, the server 202 does not need to transmit the challenge 222 to the client 205 in order for the client 205 to generate the challenge response 230 using the APG 210.

In some embodiments the ability of the client 205 to generate the challenge response 230 may be protected by a password. In such embodiments, the address specifying which device(s) in the PUF array 260 to access may be produced by combining the challenge 222 with the password. As a non-limiting example, the client 205 may input the password and the challenge into a hashing function to produce the address in the PUF array 260. As an example, if the PUF array 260 is represented as a two-dimensional array containing 256 rows and 256 columns, 8 bits of the message digest can be used to find the first coordinate X in the PUF array 260; the following 8 bits can be used to find the second coordinate Y.

The measurement of characteristics of individual PUF devices may not be perfectly deterministic. As discussed above, where PUF 260 is a ReRAM, there may be 10% to measurement to measurement variation in resistance at a given injection current, owing primarily to temperature variation. As part of the Handshaking process, the server 202 may send additional information to the client 205 for use in making generation of the challenge response 230 more reliable. The helper instructions 224 (i.e., helper instructions {224a, ... 224j, ... 224n}) may include a checksum or other error-correcting information for use with error-correcting codes, or other information or instructions used in response generation schemes to be discussed later below. Upon receiving the challenge response 230, the APG 210 may use the helper instructions 224 to generate corrected responses 232 (i.e., corrected responses {232a, ... 232j, ... 232n}). Use of the helper instructions 224 and other methods of improving the reliability of the APG 210 will be discussed further below. The corrected responses 232 may be used directly as encryption keys 240 or may otherwise be used to derive the encryption keys 240. The server 202 may similarly independently produce the encryption keys 240 using the initial responses 230 stored in the database 204. The server 202 and the client 205 may then communicate securely by encrypting messages using the shared encryption keys 240

The server 202 can authenticate a client 205 by issuing the challenge 222 to the client 205 and then comparing the corrected challenge response 232 generated by APG 210 with the initial response to that challenge stored by the server 202 for that client 205 (e.g., initial challenge responses 230) or determine that the corrected challenge response 232 is consistent with the initial challenge response 230 by comparing information derived from the corrected challenge responses 232 with information derived similarly by the server 202 from one of the initial challenge responses 230 corresponding to the challenge 232 issued by the server. The server 202 may require that the corrected response 232 is identical to the expected response to the challenge 222 (i.e., the initial response 230 corresponding to the challenge 222) in order to authenticate the client 205. Alternatively, the server 202 may accept a corrected response 232 with a Hamming distance (or a value of another distance metric) less than a predetermined maximum value from the expected response as evidence that the challenge response 230 is consistent with the expected response. For example, the server 202 may infer that the client 205 has generated a response which differs by less than a predetermined maximum number of symbols from the initial response 230 and determine that the challenge response 230 is consistent with the initial response 230 (i.e., was generated by a client 205 in possession of the same PUF array used to obtain the initial response 230). When the CRP error rates are relatively low, the responses can be used as part of authentication protocols. In such cases, Hamming distances between responses and the expected responses as large as 10% of the total response length may still be used to provide acceptable false-accept and false-reject rates (FRR and FAR). When the CRP error rates are too high, the use of error-correcting methods may be used to improve both FAR and FRR.

It will be appreciated that secure communications between a client and server in the architecture of FIGS. 4A and 4B may be compromised if an attacker is able to characterize the response of the client PUF. This may occur, for example, if an attacker gains temporary physical possession of a client device and is able to generate and store responses for all ReRAM cells for a range of expected measurement input currents. The attacker, in this hypothetical, may then be capable of receiving challenges (e.g., ReRAM cell addresses and input currents) from the server, and generating the correct, expected responses from the attacker's database. From this, the attacker could provide a correct authentication response to the server, or could generate a private key corresponding to the private key generated by the server.

Methods according to certain embodiments enable the use of ReRAM arrays to sense exposure to a third party (i.e., a hacker), and thereby to uncover the attack described immediately above. Such methods are based on the assumption that the attacker is likely to operate the device in a range of electric power that will cause damage or premature pre-forming to a significant part of the cell population. In certain embodiments, this cell population may be identified, and then measured, to determine whether an attacker has attempted to characterize the client device by measuring those cells with a large range of current values. For the purposes of further discussion, the population of cells likely to be permanently altered by pre-forming will be referred to as the vulnerable cell population (VCP). The cells that can be safely measured, and are used to generate cryptographic keys, will be referred to as the rugged cell population (RCP). If the third party inadvertently uses part of VCP to characterize the cells or to generate cryptographic keys, a large percentage of these cells will be damaged, leaving behind traces of the attack, which can be detected according to embodying methods.

In the method described herein, cells of a ReRAM PUF are first characterized and sorted into two categories: VCP and RCP. The VCP includes cells that will begin the pre-forming process at a lower voltage than the RCP. Obviously, one cannot identify the VCP by ramping voltage across all cells until some of them begin the pre-forming process, because the pre-forming process is irreversible. Therefore, low voltage (i.e., low injection current current) measurements are used to predict which cells will begin pre-forming at lower voltages (i.e., lower injection currents).

Figure 2:
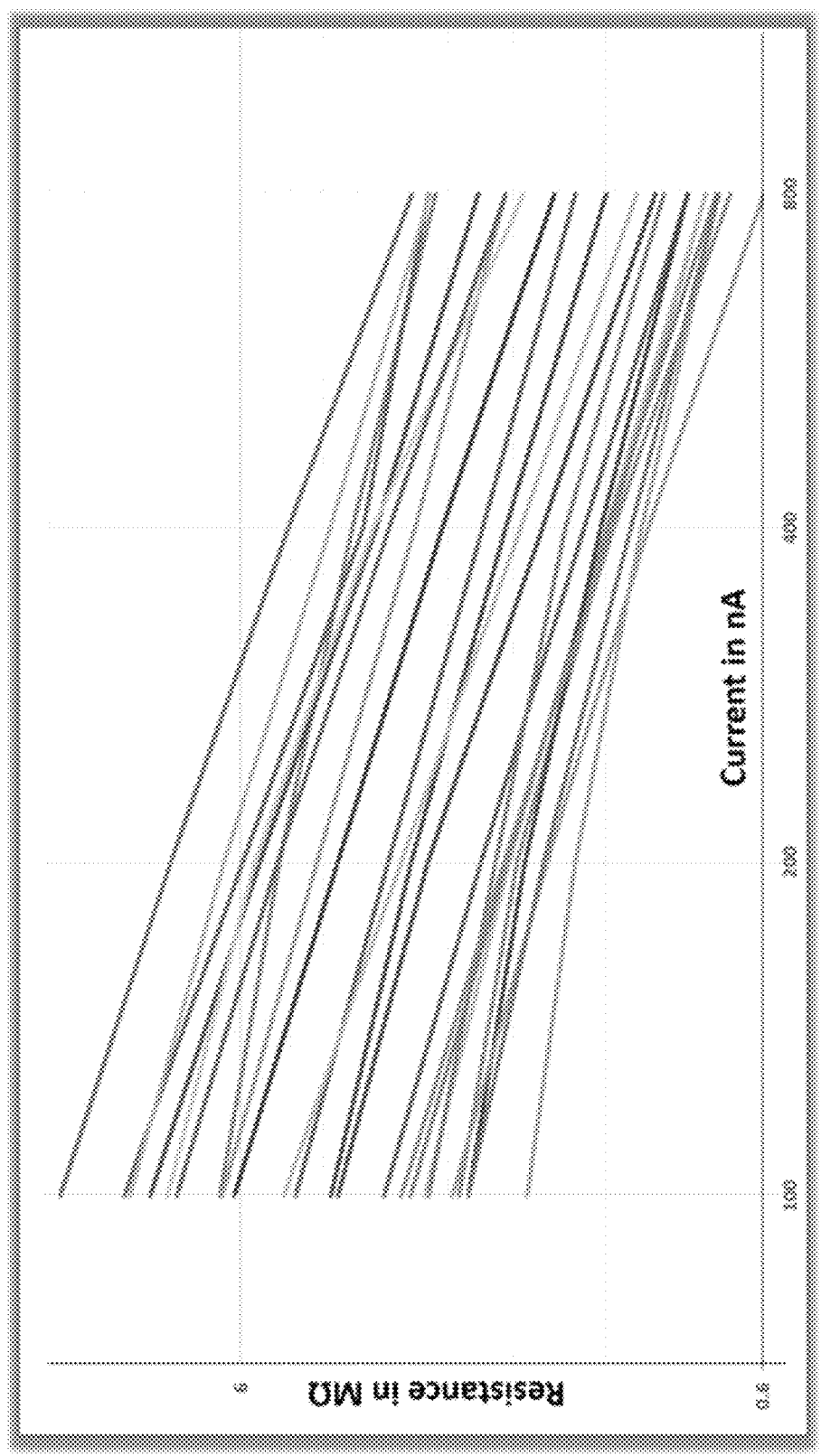
FIG. 2 depicts one example of inter-PUF variations of resistance values observed for several ReRAM cells subject to various injected currents.

Referring again to FIG. 2, as can be seen, the cell-to-cell resistance variation at a constant injected current is high on a typical unformed ReRAM array. In the example of FIG. 2, the resistance varies from approximately 1 MΩ on the low end of the distribution to 8 MΩ at 100 nA. Additionally, the voltage varies from 0.1 V to 0.8 V, which is quite large. As shown above in Equations 1 and 2, high electric field conditions could result into forming or dielectric breakdown; however, the higher end of the distribution, 0.8 V, remains relatively low. At higher levels of injected current, the situation gets worse. In the case shown in FIG. 2, at 800 nA the resistances vary from approximately 0.6 MΩ to 3 MΩ, and the voltages vary from 0.48 V to 2.4 V, which approaches the threshold of damaging or forming the cells.

Figure 5:
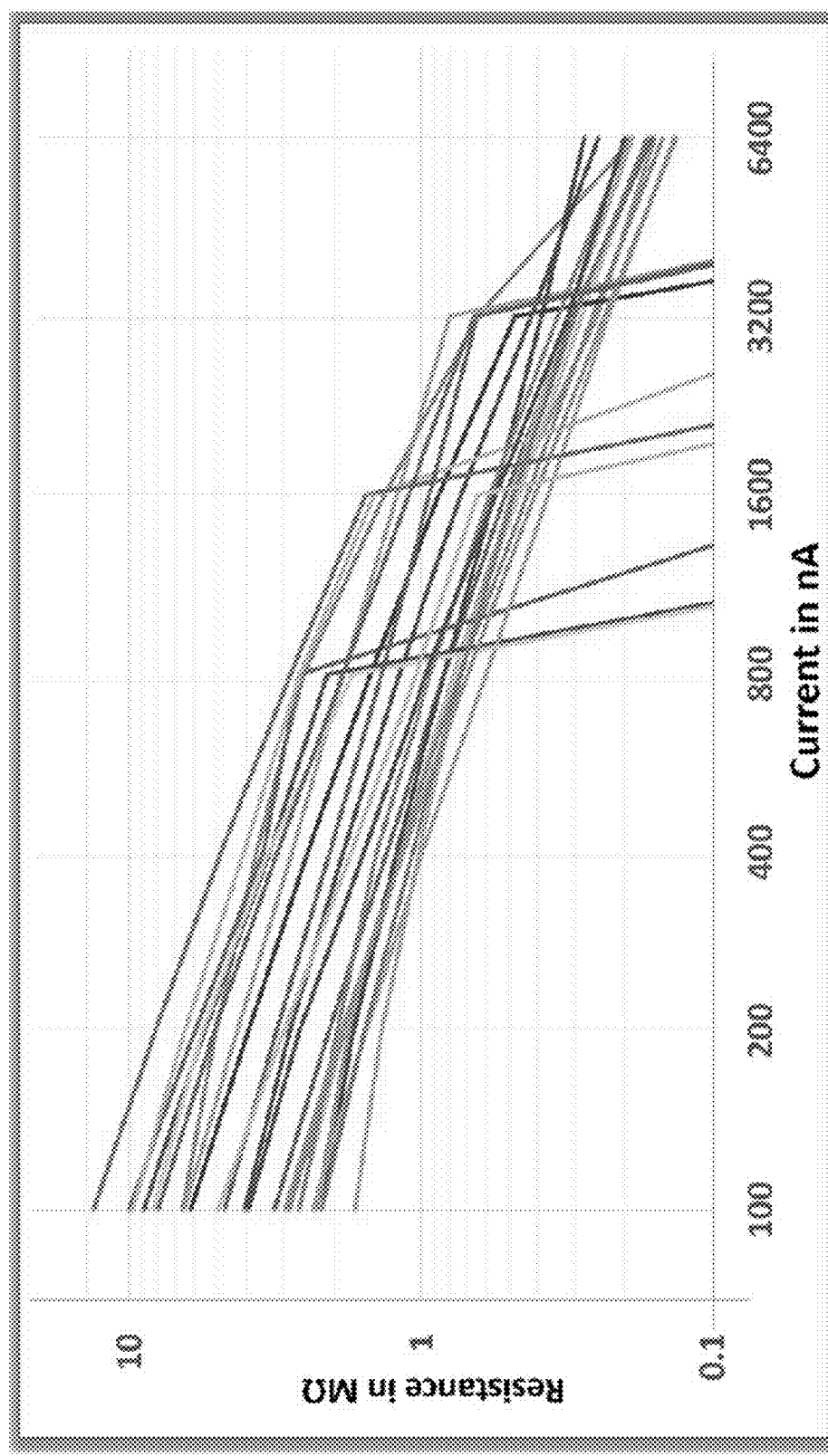
FIG. 5 depicts one example of ReRAM cells subject to various large injected currents.

Referring now to FIG. 5, there is shown a case where the currents are pushed past 800 nA, all the way to 6.4 μA. It is evident that most cells that are in the top 40% of the resistance distribution at 100 nA collapse or break down (i.e., begin filament formation or the forming process) between 800 nA and 6.4 μA, while most of the cells in the bottom 40% can handle that current level. In all cases, in the example of FIG. 5, an acceptable threshold for this technology is approximately 2.5 V; the cells at the high end of the resistance distribution (i.e., the VCP) eventually reach the threshold at a certain current, while the cells at the bottom of the distribution (i.e., the RCP) stay below the threshold even at the highest current.

As is discussed above, measurements of ReRAM devices should be kept below a critical value of the electric field to avoid irreversible damages or pre-forming. Since the thickness of the cells is approximately constant, the critical value of the electric field is directly proportional to the cells' resistance values. Thus, in the ReRAM's measured, there is also a critical resistance value at 100 nA in which damage or pre-forming will occur at higher currents.

The observations set forth above suggest a method to classify ReRAM cells into the RCP and VCP categories. As discussed, cells that have a relatively lower resistance, at all injection current levels, tend to be capable of handling higher injection currents than cells with relatively higher resistance. Thus, one method starts by selecting a likely safe injection current value (i.e., a safe probe current), which is a current level that is not capable of breaking down or beginning the formation process for any or for only a tiny fraction of the ReRAM cells. This likely safe probe current value may be selected analytically, e.g., by calculating the electric field strength of hypothetical cells built according to specified dimensions, and then selecting an injection current known to produce a field strength significantly weaker than that which would be required to start cell breakdown. Alternatively, the likely safe probe current can be based experimental data and/or experience with devices built to the same or similar specifications to the ReRAM device to be used for PUF generation. In these embodiments, measurements may be taken of ReRAMs fabricated to identical or similar specifications to the ReRAM to be used as a PUF generator, and by such measurements on a sacrificial device or devices, an injection current may be selected that will not cause breakdown in any cell, or in only a small fractions of cells. In the device of the example above, depicted in FIG. 5, 100 nA is a safe probe current value that does not trigger the formation process in any cell.

Once the likely safe current level is determined, it may be used to measure the resistances of the cells in the ReRAM device to be used for PUF generation. This may be accomplished, for example, by measuring the applied voltage necessary to put the likely safe current through the cell and calculating the resistance on the basis of voltage and current. In the example cells depicted in the Figures, this step involves measuring cell resistances at 100 nA. The cells can then be sorted according to their measured resistances (e.g., their resistances at 100 nA). Then, one or more thresholds or break points can be applied, and cells with resistances above a threshold can be classified as VCP (cells that will tend to break down at lower injection current values), and cells below a threshold can be classified as RCP. An exemplary set of thresholds would classify cells in the top 40% in the VCP category, and cells in the bottom 40% in the RCP category. An alternative threshold scheme would put cells in the top 40% of resistance in the VCP category, and the remaining cells in the RCP category. Other break points or thresholds are possible. It is contemplated that thresholds may be determined on the basis of experimental experience with ReRAM devices built to identical or similar specifications to the ReRAM being used for PUF generation. For example, as seen in FIG. 5, it was determined that cells in the top 40% of resistance at 100 nA tended to break down below about 6.4 uA, and so 60-40 was a reasonable threshold to select for devices made according to specifications resulting in the measured devices of FIG. 5. In practice, lower resistance thresholds may be selected since, as set forth below, the number of ReRAM cells necessary for PUF generation, which will be pulled from the RCP group, is relatively small.

Figure 3:
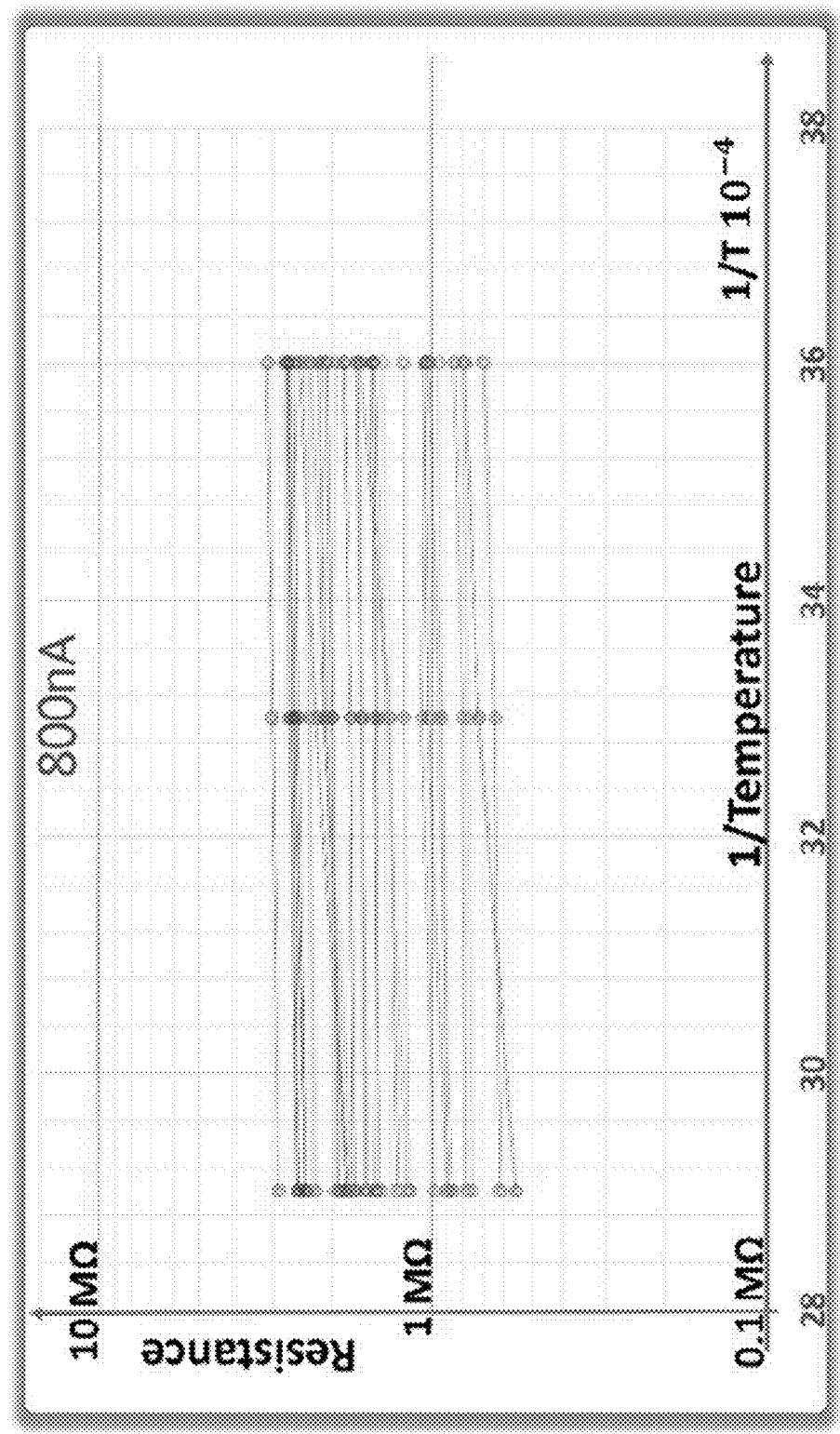
FIG. 3 depicts one example of inter-PUF variations of resistance values due to temperature effects. Temperature is shown in degrees Kelvin.
Figure 6:
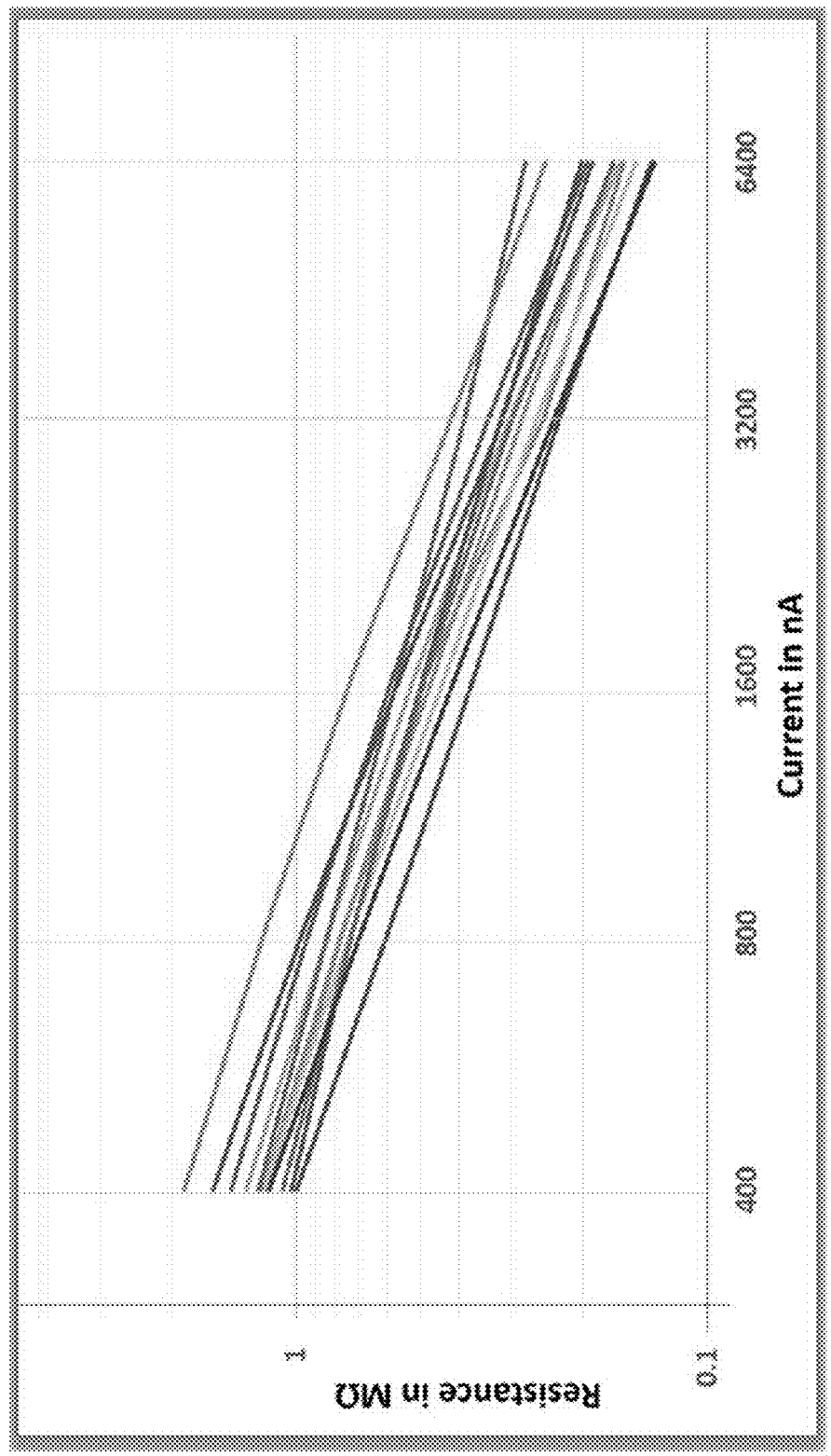
FIG. 6 depicts one example of ReRAM cells part of a rugged cell population (RCP) subject to various large injected currents.

It is advantageous to avoid using the population of cells with high resistance (i.e., the VCP) in the final PUF protocol if current likely to risk breakdown among those cells (in the examples above, higher than 400 nA) is injected. Conversely, the population of cells with low resistance (i.e., the RCP) can operate in the extended injected current range. To demonstrate this concept, the variations in resistance value of the cells representing the RCP of the population used in FIG. 3 and FIG. 5 are shown in FIG. 6 with currents varying from 400 nA to 6.4 $\mu$A. As can be seen, those cells do not show the characteristic sudden drop in resistance at a critical current level, which means they can sustain being interrogated throughout the current range without beginning the forming process.

The cells in the selected RCP group still show sufficiently large cell-to-cell variations in resistance at every probe current level and are sufficiently sensitive to the level of injected current to be usable for PUF generation. In these figures, a small number of cells are shown to make the data readable. In a practical implementation, the total population for a PUF will be several tens of thousands of cells with only 256 cells selected to feed a cryptographic protocol such as the Advanced Encryption Standard (AES).

Once the RCP has been identified, the ReRAM array may be characterized and used for PUF generation and secure communications. An exemplary cryptographic protocol using such a device will now be described.

In the protocol that follows, all terminal devices (e.g., client devices such as those depicted in FIGS. 4A and 4B) that are part of the network protected by the server contain a ReRAM array and an Addressable PUF Generator (APG) circuit. As discussed above, the APG circuit may contain a processor capable of executing instructions (e.g., instructions received from the server), a non-volatile memory, a pristine ReRAM array, network communications interface, and circuitry capable of interrogating addressable cells of the ReRAM array (i.e., applying injection current), measuring resistance of the interrogated cells, and encoding the resulting resistance values into a binary bit stream. Resistance may also be calculated as a function of applied voltage to achieve a predetermined injection current value. When 256 random addresses are secretly identified by the server, and communicated to the client, the APG can extract a 256-bit long key from the ReRAM PUF at these addresses. The PUF exploits ephemeral conductive paths as described above.

Enrollment: Each client PUF is enrolled prior to deployment. During enrollment, the PUFs of all terminal devices are fully characterized once, upfront, and in an environment in which there is secure communication between the client device and the server. The resistance of all cells is characterized at low current, for example, a known safe probe current or a known current that is unlikely to cause start of the forming process for any cell in the array. The low current value may be selected on the basis of one of the methods described above. An exemplary low current value may be 100 nA. After resistance is measured at the low current value, the cells are sorted into RCP and VCP categories by applying one or more thresholds or ranges. The goal is to identify cells with low resistance at the measured current, which are categorized as RCP cells, and are kept for future characterization and use. By way of example, cells in the bottom 60% percentile of resistance may be categorized in the RCP category. The cells outside of the RCP category, which will tend to have higher resistance, are categorized in the VCP category, and are ignored.

Once identified, the resistance values of the RCP are measured in a large range of injected currents and stored in a look-up table by the server. The look-up table contains the address of all cells. In certain embodiments, no information is stored for the VCP. In other embodiments, the VCP cell identities are stored at the server for future security checks. For RCP cells, the information stored in the look-up table allows access to the resistance values at various levels of injected currents. In certain embodiments, the temperature at the time of measurement may also be stored.

Figure 9:
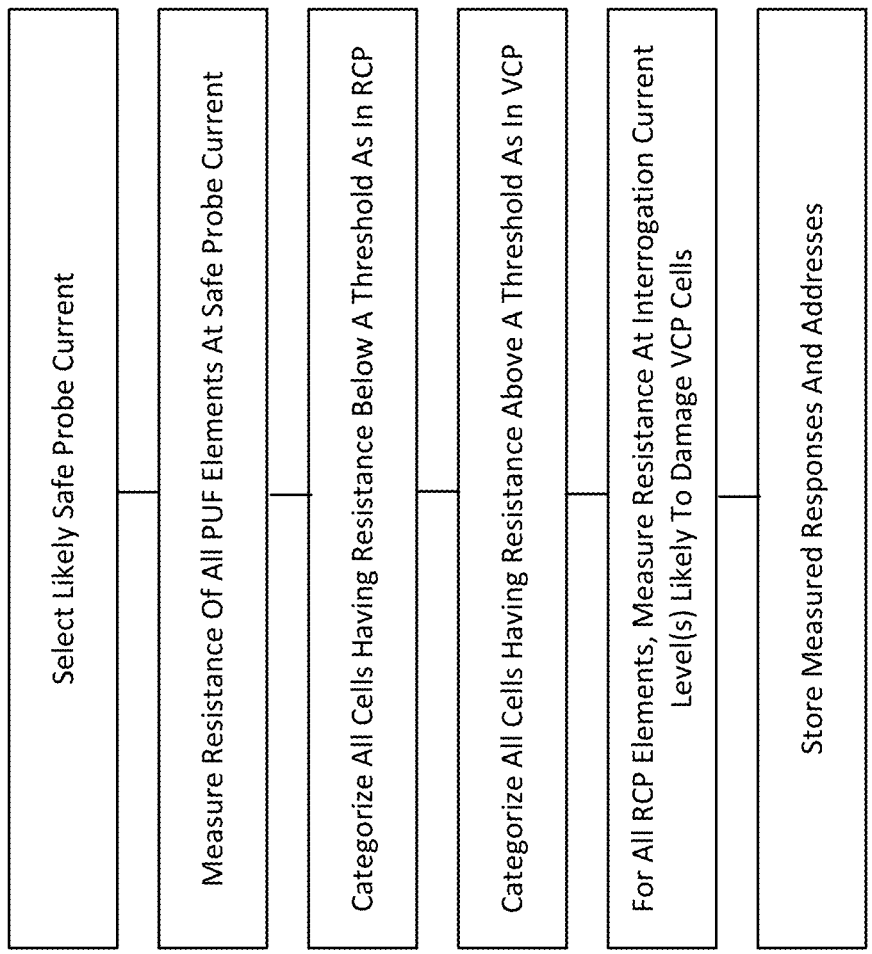
FIG. 9 illustrates an exemplary process for enrolling a ReRAM PUF device according to one embodiment.

In other embodiments, the RCP cell resistances are measured at one or more interrogation current levels that are likely to damage or begin the preforming process in the VCP cells, but not the RCP cells. This predetermined level may determined, as discussed above, analytically, as a function of the device parameters, or experimentally, by analysis of similar devices. In the device of the Figures, for example, the predefined interrogation current level used to measure the RCP cells might be 6.4 uA, which is safe for the RCP cells, but above the breakdown threshold for the VCP cells. An exemplary cell sorting and enrollment process described above is illustrated graphically in FIG. 9.

Key Generation by the Server: To initiate the key generation, a set of addresses is generated by a cryptographic protocol such as, but not limited to, the ternary addressable public key infrastructure (TAPKI). The selected addresses may be randomly generated in connection with a random number generator or pseudorandom number generator at the server. Among these addresses, the server identifies a predetermined number of cells (e.g., 256) that are part of the RCP and ignores the other cells (e.g., VCP cells or cells not in either category). The cryptographic keys are generated from the reading resistance value of these cells at a given level of injected current, which again, are stored in the lookup table. In certain embodiments, every resistance value in the key is from the same injection current value, but this is not a requirement. The server may generate the key on the basis of different injection current values for different addresses, different injection current values for the same address, or combinations of all of the above. In certain embodiments, the injection current values selected for key generation are sufficiently low to be out of the danger zone for all cells, including VCP cells. For the example cells of the Figures, such a current level might be 400 nA. In a preferred embodiment, the injected currents are high enough to be in the danger zone for damaging (i.e., starting the formation process for) the VCP cells. In the example of the Figures, this current level might be 3.2 or 6.4 uA. If the VCP cells were to be submitted to such currents, a significant proportion of the cells would be damaged or pre-formed. This, in an example according to a preferred embodiment, the server randomly generates 256 addresses corresponding to RCP cells measured at 6.4 uA.

In normal operation, because the key generated by the server only includes addresses of RCP cells, no VCP cells will be interrogated by the client with potentially damaging current levels. This may occur, however, if an attacker has gained physical or electronic access to the PUF, and is attempting to comprehensively characterize it, or if the attacker is aware of the interrogation current value for the protocol, but not the PUF addresses of a particular key. In such an event, the attacker may sweep the entire array with a large voltage range, resulting in a large current range, which will include damaging current values for the VCP cells. Similarly, if the attacker is aware of interrogation current value (which unbeknownst to the attacker is likely to begin formation in the VCP cells), and the attacker uses that value to attempt to comprehensively characterize the PUF by measuring the resistance of all cells, many of the VCP cells will be damaged. This allows the system to detect attempts to compromise the client device.

There are several possible methods usable to detect tampering or unauthorized access to the client PUF that are usable with the systems described herein. In a first method, the client device may store the identities and resistance values (measured at the safe probe current level) of the VCP cells in non-volatile memory located at the client device. The client device may then periodically measure, at the safe probe current level, the resistance of one or more of the VCP cells, and compare the resultant measurement with the stored data. A drop in resistance below some relatively small threshold (i.e., 10% of the value of the initially measured resistance), will indicate that a cell has been subjected to the preforming process, and a third party has attempted to characterize the device. Alternatively, the client device may be prompted to initiate this process by communication from the server. In the event that the client device determines that it has been compromised, it may take itself offline, refuse communication from the server, or transmit a status indicator or an alert to the server for further action.

The methodology described immediately above has the disadvantage that the client device stores the VCP information, which makes that information vulnerable to attack. In other embodiments, the server directs the client to measure one or more of the VCP cells at the initial safe probe current level, and that data is transmitted back to the server, which then checks the resistance values against the server's stored record of VCP resistance values measured at the same current level. This process may be done periodically, at the direction of an administrator, or it may be done as part of a handshaking process that precedes any communication between the client and server. If altered VCP resistances are detected, the server may classify the client as compromised, and refuse all further communication with it. The server may also alert the client, or issue an alert to an administrator for further action.

Figure 10:
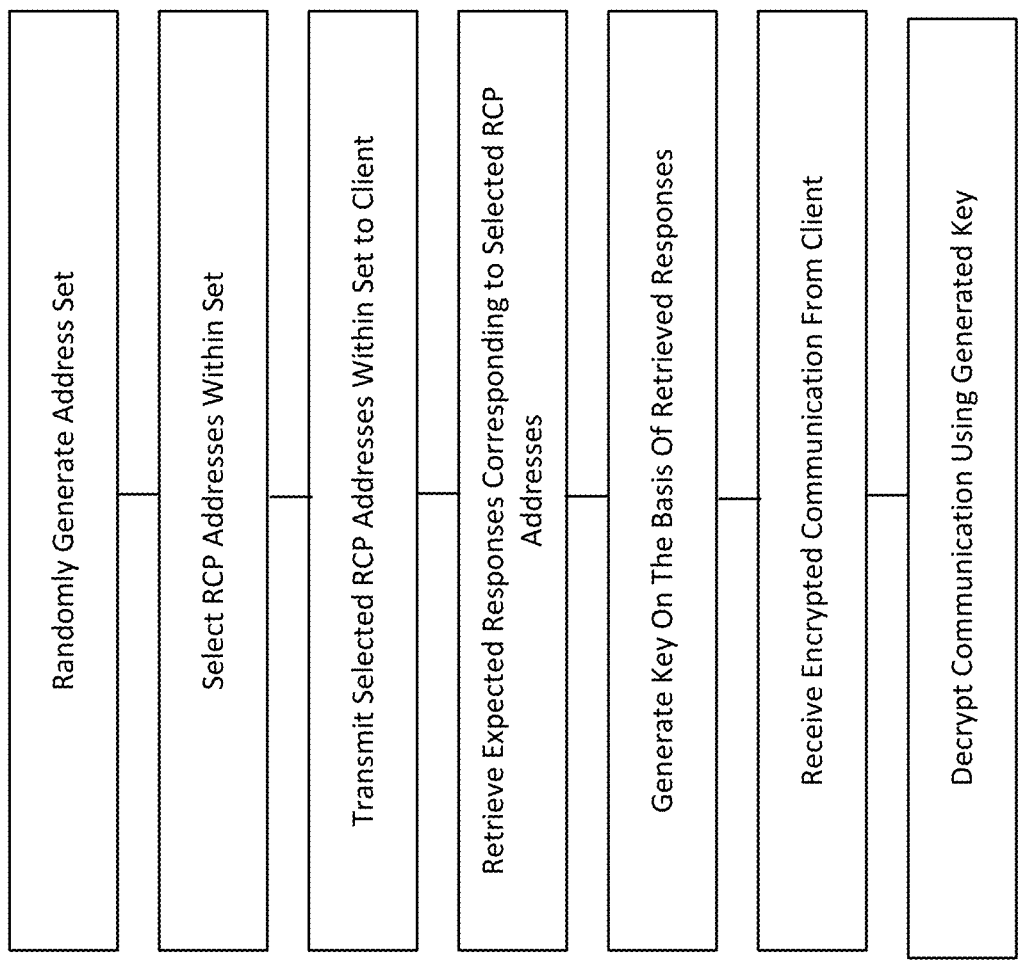
FIG. 10 illustrates an exemplary process for secure communication with a client computing device according to one embodiment.

Key Generation by the Client Device: The addresses of the cells used by the server to generate the keys are secretly exchanged with the client device with a protocol such as, but not limited to, TAPKI. The client device uses the same level of injected interrogation current used during enrollment to generate the same key, which may be used to encrypt communications between the client and the server. The server generates the same key from its enrollment database. This process of sending the selected addresses, generating the server side key, and decrypting a received communication encrypted with the same key is illustrated on the server side in FIG. 10.

Various error correcting schemes can be used to guarantee that both keys are a match. For example, particularly in an authentication scenario, a match may be declared (e.g., by the server) if the client's measured response bitstream is within a predefined Hamming distance of the expected response generated by the server. Alternatively, in an embodiment more useful when the devices are encrypting communications with generated keys, the server may send helper instructions to the client that allow the generation of a corrected response (i.e, the same key as that generated by the server). This may be helpful, for example, in cases where the client is interrogating the PUF at a different temperature than that at which the PUF was enrolled by the server. The helper instructions may allow the client to correct the response to compensate for errors introduced by the temperature difference. Suitable error correction methods are disclosed in co-owned U.S. patent application Ser. No. 16/818,807, which again, is incorporated herein by reference in its entirety. In other embodiments, the raw response data from the client (i.e., the measured resistance values), and the expected response data from server (the measured resistance values at enrollment), may be subjected to ternary encoding, which results in ignoring unstable, error prone cells, and therefore mitigates inconsistent responses from the PUF cells. This process is discussed further below.

Any attempt by a third party to read the resistance of the VCP cells would result in a permanent noticeable decrease in the electrical resistance of certain cells. This irreversible effect acts as a sensor to detect attempts to tamper with the device. Protocols such as the TAPKI use ternary cryptographic schemes to mask the addresses of the VCP cells from the RCP; therefore, this new scheme makes it substantially more difficult to physically explore the PUF unnoticed.

Figure 7:
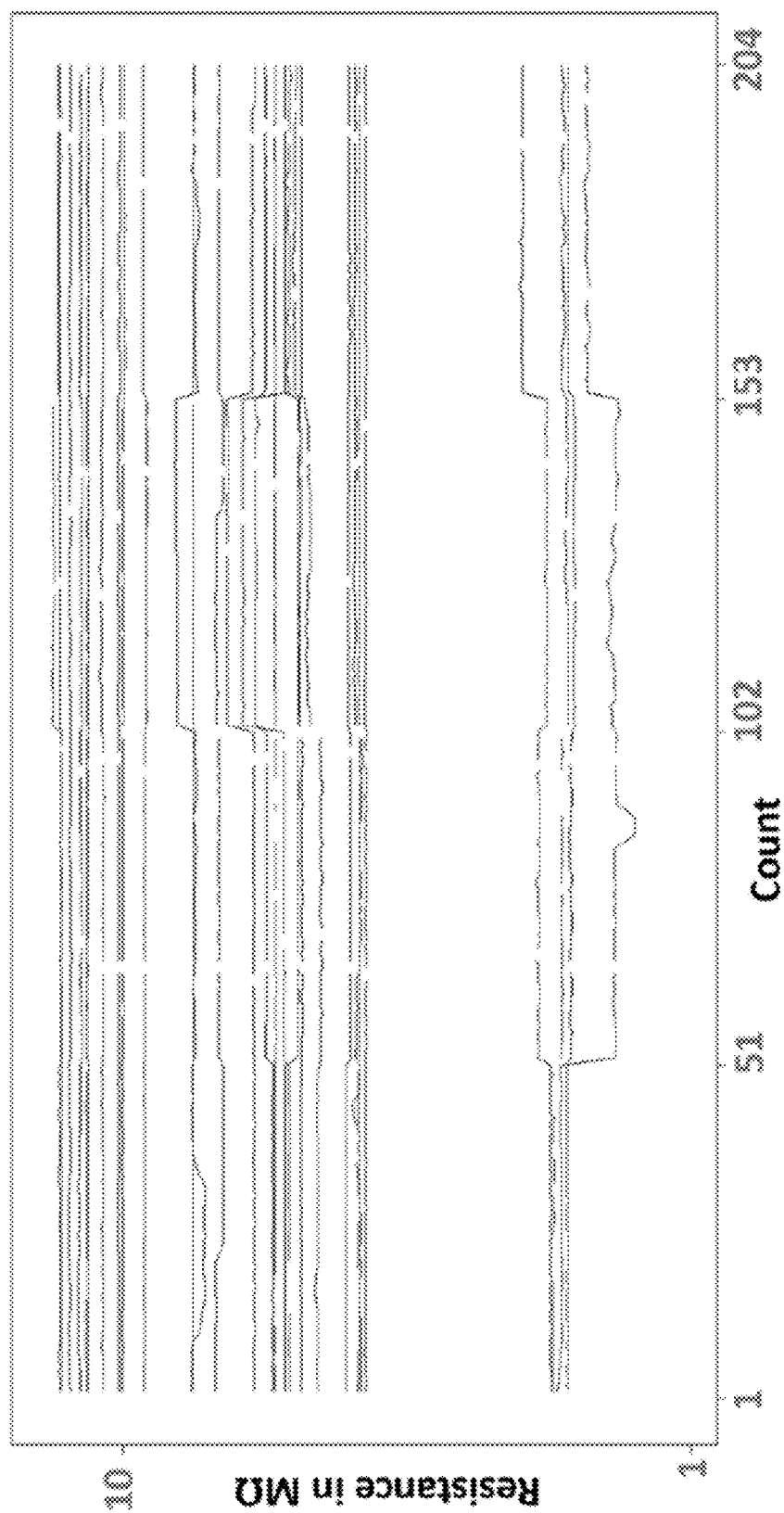
FIG. 7 depicts one embodiment of enrollment at −100 nA and 23° C. wherein the devices are read many times to establish the final resistance values for storage in the look-up table.

It is contemplated that the server may categorize cells into VCP and RCP, and generate the expected PUF responses at the same time. For example, in certain embodiments, ReRAMs may be enrolled using a Source Measure Unit (SMU). The SMU may be used to characterize ReRAMs at the bare wafer device level where ReRAM devices' Wordline and Bitline pads are exposed. By using semi-automated means within the SMU, the ReRAM arrays may be read through at a specific electrical current and temperature. The current and temperature readings, along with the positions in the device (i.e., addresses), are saved as reference data. With all necessary information saved, the analysis can be done allowing for correct placement of cells into their respective VCP or RCP groups. Exemplary data resulting from such a process is depicted in FIG. 7.

Alternatively, in other embodiments, enrollment may be accomplished using Data Acquisition Board in conjunction with a processor, such as an FPGA or a microcontroller. To acquire the required data without an SMU, a custom data acquisition board that pairs with a microcontroller or Field Programmable Gate Array board (FPGA) is advantageous. This custom board provides the required hardware for interfacing and gathering device measurements (e.g., circuitry capable of injecting variable current across the cells of the ReRAM array and measuring the resulting resistance, either directly or indirectly, ADC/DAC circuitry, etc.). In such embodiments, the device's memory contents (i.e., the ReRAM cells) will be stepped through in a similar fashion to the SMU's enrollment method. All corresponding data (current, temperature, device location or address) will be saved on nonvolatile memory located on the custom board. The microcontroller or FPGA allows for real time analysis and VCP or RCP group designation to be made on each device.

As is suggested above, systems operating according to methods disclosed herein are usable to support ternary addressable public key infrastructure, as well as binary or simple PKI. In a binary scheme, a threshold is applied to the resistance values of the ReRAM elements identified by the server, which are being used for key generation. Resistance values above the threshold (e.g., the median resistance of all the addresses in the key) are assigned a "1" state, and all resistance values below the threshold are assigned a "0" state. The resulting bit stream may then be used as the cryptographic key, or to generate the cryptographic key. A possible drawback with binary encoding is that ReRAM cells with resistances close to the threshold may be unstable (e.g., due to temperature changes and/or variations in measurement-to-measurement stability of the measurement circuitry), and may therefore be coded as a "0" sometimes, and coded as a "1" other times.

To address this problem of unstable cells (cells with resistances close to the threshold, e.g., the median resistance of all cells), unstable or "fuzzy" cells may assigned a ternary state and be removed from inclusion in the keys generated by the server or client. Such cells may be identified at the enrollment stage, when the server's cryptographic table of expected responses is built. One method of blanking fuzzy cells would be to measure the response of all RCP cells, determine the median, apply a threshold around the median having an upper and lower bound, and then exclude all cells within the upper and lower bound from inclusion in addresses used for key generation. Under such a method, the client would never be called upon to generate responses corresponding to the blanked "fuzzy" cells—such cells would be excluded from the server's generated set of 256 addresses. In alternative embodiments, the server may initially include the fuzzy cells in the stored table for all the RCP cells, but in the event that one or more fuzzy cell addresses is indicated by the random address generation step, the sever can send blanking instructions to the client to generate a key that ignores the response of fuzzy cells. The server may then generate its own key while also ignoring the fuzzy cells.

Figure 8:
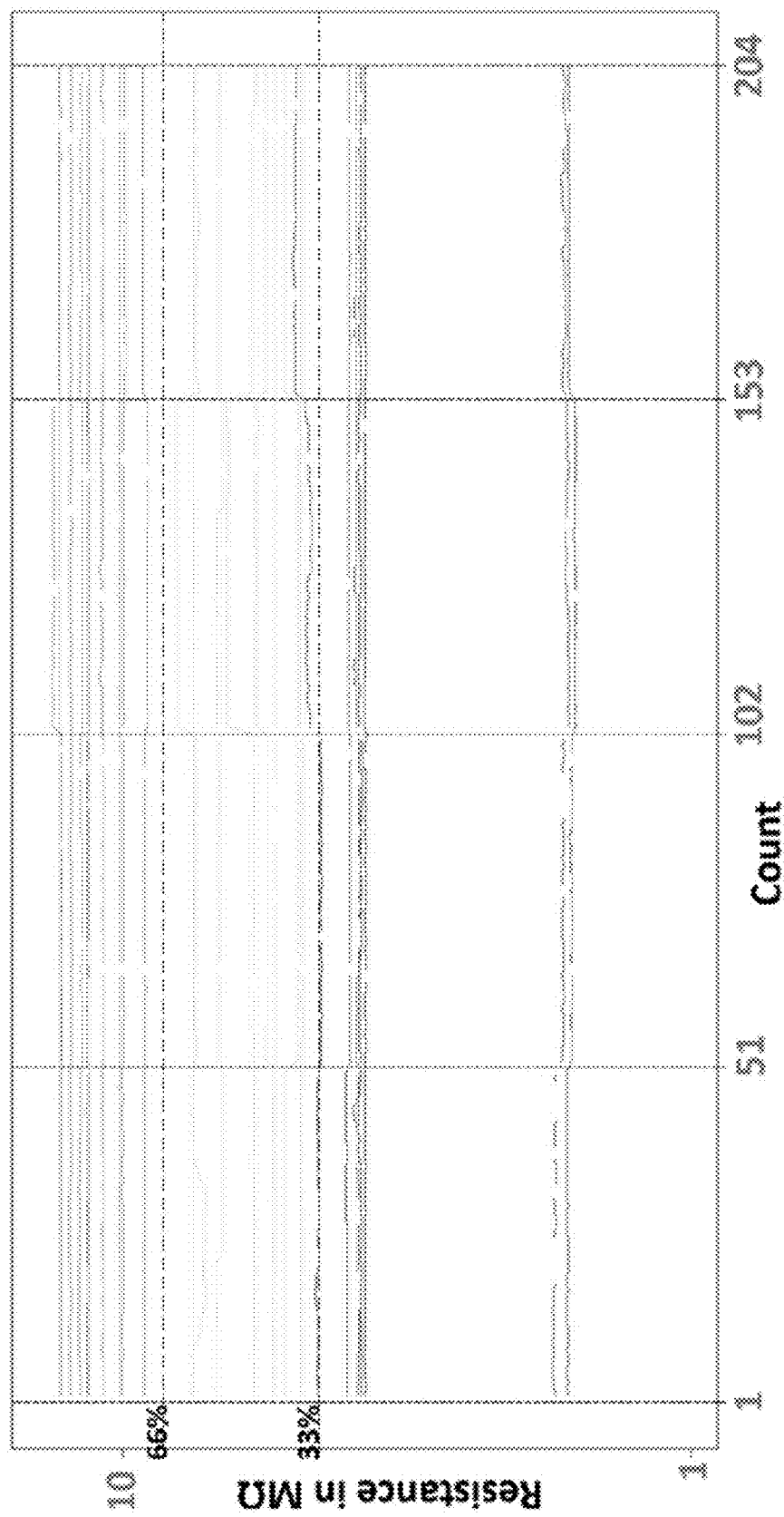
FIG. 8 depicts one embodiment of TAPKI establishing ternary states where green is "+", yellow is "0" or fuzzy state, and red is "−".

In alternative embodiments, systems may use a ternary, rather than a binary encoding scheme. In such embodiments, once a set of random addresses has been selected by the server, and the fuzzy or unstable cells removed, a cryptographic scheme such as TAPKI can be used to define three states, such as (−, 0, +), for the resistive values. This can be done by defining a 33% and 66% quantile of the values. This also allows transition from ternary to binary where the bottom quantile can be defined as "0" and the top quantile as "1". In the example of FIG. 8, the cell resistances above the 66% threshold would be coded as 1s, the cell resistances below the 33% threshold would be coded as 0s, and the cells in between would be given an "x" state. Next, the server exchanges their selected addresses to the client to read its devices where the two PUFs look to match their respective key bit streams, which may involve ignoring the "x" cells in the comparison.

While the description of cryptographic methods and protocols above has made reference primarily to ReRAM PUFs, it should be appreciated that the methods and protocols are equally applicable to PUFs based on other memory devices using dissolvable conductive pathways such as Conductive Bridge RAMs (CBRAM) and Memristors.

The invention claimed is:

1. A method of establishing secure communication between a server and client computing device, the client computing device including an array of unformed memory cells in which formation of breakable conductive paths may be induced, the method comprising:
  performing an enrollment process on the client computing device, the enrollment process comprising:
    selecting a probe current value, the probe current value being sufficiently low such that when current is passed through the memory cells of the array of unformed memory cells, the cells do not exhibit conductive path formation;

applying the selected probe current value to the cells of the array of unformed memory cells, and measuring their resistance;

categorizing all measured cells having a resistance above a first threshold in a first category, and categorizing all measured cells having a resistance below a second threshold in a second category;

selecting an interrogation current value, measuring the resistance of the cells categorized in the second category at the interrogation current value;

storing the measured resistance of the cells categorized in the second category and addresses of the measured cells in a database.

2. The method of claim 1, wherein the interrogation current value is chosen to be a current value likely to cause conductive filament formation in one or more cells categorized in the first category.

3. The method of claim 1, further comprising generating a set of addresses of cells categorized in the second category, and transmitting the addresses to the client computing device.

4. The method of claim 3, wherein generating a set of addresses of cells categorized in the second category comprises generating the set of addresses on the basis of random or pseudorandom numbers.

5. The method of claim 3, further comprising, generating a cryptographic key on the basis of the generated set of addresses categorized in the second category.

6. The method of claim 5, further comprising, decrypting an encrypted communication received from the client computing device with the cryptographic key.

7. The method of claim 1, further comprising storing the measured resistance of the cells categorized in the first category at the selected probe current values, and addresses of the cells categorized in the first category in a database.

8. The method of claim 7, further comprising measuring the resistance of cells categorized in the first category at the probe current value and comparing the measured resistance of the measured cells to a previously measured resistance of the same cells at the probe current value.

9. The method of claim 8, further comprising, on the basis of the comparison, determining that the client computing device has been comprised.

10. The method of claim 1, wherein the array of unformed memory cells is one of an array of resistive RAM cells, memristors or Conductive Bridge RAM cells.

11. The method of claim 1, wherein measuring the resistance of the cells categorized in the second category at the interrogation current value further comprises identifying unstable cells on the basis of the resistance measurement.

12. The method of claim 11, further comprising generating a set of addresses of cells categorized in the second category, and transmitting the addresses to the client computing device, further comprises excluding the addresses of unstable cells.

13. A method of secure message exchange with a server computing device, comprising:

receiving a set of addresses corresponding to unformed memory cells in an array of unformed memory cells in which formation of breakable conductive paths may be induced;

measuring the resistances of the cells corresponding to the received addresses at a predetermined current level;

generating a cryptographic key on the basis of the resistance measurements;

using the cryptographic key to encrypt a message, and transmitting the message to the server computing device.

14. The method of claim 13, wherein the predetermined current level is unlikely to induce conductive path formation in the measured cells.

15. The method of claim 14, wherein the predetermined current level is incapable of inducing conductive path formation in the measured cells.

16. The method of claim 13, wherein the array of unformed memory cells is one of an array of resistive RAM cells, memristors or Conductive Bridge RAM cells.

17. A cryptographic communication system comprising:

a client computing device in electronic communication with an array of unformed memory cells in which formation of breakable conductive paths may be induced, the client computing device being configured to measure the resistance of one or more of the unformed memory cells in response to computer executable instructions identifying one or more of the unformed memory cells to be measured;

a server computing device in electronic communication with a non-volatile memory having computer readable data encoded therein reflecting resistance measurements of a plurality of cells of the array of unformed memory cells at an interrogation current level and addresses of those cells.

18. The system of claim 17, wherein the non-volatile memory has computer readable data encoded therein categorizing the unformed memory cells into a first category based on having a first range of resistances when measured at a predetermined probe current level and a second category having a second, lower range of resistances when measured at the predetermined probe current level.

19. The system of claim 18, wherein the predetermined probe current level is a level insufficient to induce conductive path formation in the unformed memory cells.

20. The system of claim 17, wherein the predetermined interrogation current level is sufficient to induce conductive path formation in the unformed memory cells in the first category.

* * * * *

UNITED STATES PATENT AND TRADEMARK OFFICE
CERTIFICATE OF CORRECTION

| | |
|---|---|
| PATENT NO. | : 11,610,629 B2 |
| APPLICATION NO. | : 17/395360 |
| DATED | : March 21, 2023 |
| INVENTOR(S) | : Bertrand F. Cambou et al. |

It is certified that error appears in the above-identified patent and that said Letters Patent is hereby corrected as shown below:

In the Specification

Column 2, Line 34, "cc" should be --εc--.

Column 2, Line 58, "FIRS" should be --HRS--.

Signed and Sealed this
Thirty-first Day of October, 2023

Katherine Kelly Vidal
*Director of the United States Patent and Trademark Office*